United States Patent Office.

STUART GWYNN, OF NEW YORK, N. Y., ASSIGNOR TO AMERICAN METALINE COMPANY, OF SAME PLACE.

Letters Patent No. 101,862, dated April 12, 1870; antedated March 30, 1870.

IMPROVED COMPOSITION OF MATTER, CALLED "METALINE," FOR JOURNALS, BEARINGS, &c.

The Schedule referred to in these Letters Patent and making part of the same.

*To all whom it may concern:*

Be it known that I, STUART GWYNN, of the city of New York, in the county of New York and State of New York, have invented a new Composition of Matter, which I denominate "Metaline No. 2," designed for the purpose of journal-boxes, journal-box linings, and other similar articles having surfaces that are intended to be subjected in use to friction.

The nature of my invention consists in combining ivory-dust and spermaceti, or their equivalents, upon the principles and in pursuance of the method fully described and illustrated in the specification annexed to my application for Letters Patent for a process for making "metaline," filed in the Patent Office simultaneously herewith, and to which reference is made, whereby I produce a composition of matter having such properties and conditions that so little friction will be caused, and so little heat developed in the practical use of the above-named articles made of it, in machinery and elsewhere in the arts, that the necessity for the application of oil or any other lubricant to their surfaces is entirely obviated.

To make this composition of matter, I take of ivory-dust eighty parts by weight, and of spermaceti twenty parts. The ivory may be purchased in the form of scraps, saw-dust, turnings, &c., and reduced to powder by grinding, which may be best done in a buhr-mill.

The spermaceti is to be intimately mixed with the ivory-dust, which will be best accomplished by grinding them together in a suitable mill for some time, say two or three hours. The mass is then to be subjected to severe pressure in molds, to give it the required solidity, which may be most conveniently done by a hydraulic press.

In journal-boxes made of or lined with this compound, shafts may be run at a high speed without a lubricant.

While I intend to limit myself in this specification to animal substances for the principal element of said compound, whose conditions need modification to convert it into "metaline," other products of animal growth, besides ivory-dust, its equivalents for the purpose intended may be employed, and other agents besides spermaceti, its equivalents for the purpose intended, may be used. So also the relative proportions of the ivory-dust and spermaceti, or their equivalents above stated, may be varied within the limits of the process hereinbefore referred to without departing from the spirit of my invention.

Claim.

I claim as my invention—

The manufacture or preparation of a composition of matter which I denominate "Metaline No. 2," when the same possesses the properties, and is compounded of the ingredients or their equivalents in the proportions, by the process, and for the purposes set forth.

STUART GWYNN.

Witnesses:
HENRY N. MYGATT,
JNO. D. PATTEN.